May 12, 1964   L. KUNZMANN ETAL   3,132,470
EXPANSIBLE LINK STRAP
Filed July 11, 1960   2 Sheets-Sheet 1

Ludwig Kunzmann
Willy Wolf
INVENTORS

BY George U Spencer
Attorney

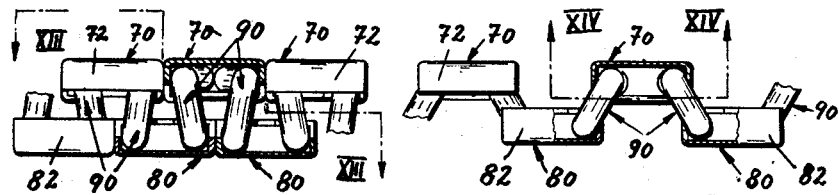
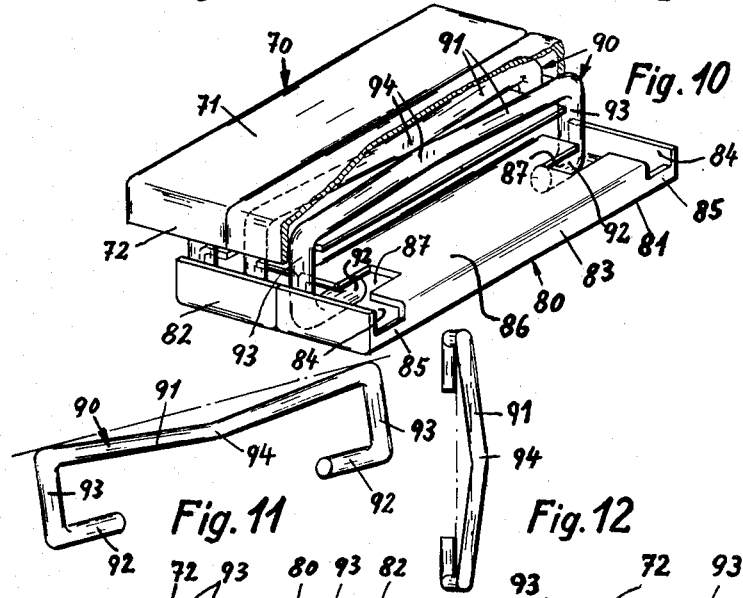
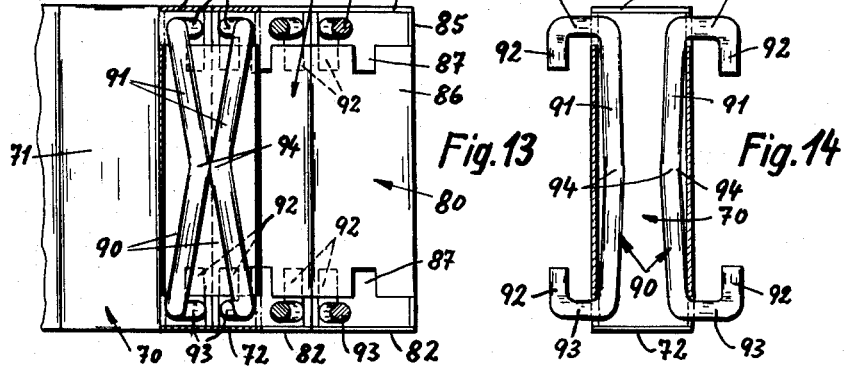

United States Patent Office 3,132,470
Patented May 12, 1964

3,132,470
EXPANSIBLE LINK STRAP
Ludwig Kunzmann and Willy Wolf, Pforzheim, Germany, assignors to Rodi & Wienenberger Aktiengesellschaft, Pforzheim, Germany
Filed July 11, 1960, Ser. No. 41,842
Claims priority, application Germany Apr. 28, 1960
9 Claims. (Cl. 59—79)

The present invention relates to improvements in expansible link straps for ornamental and utilitarian purposes and particularly in watch straps of the type which consists of two layers of links forming sleevelike casings, in which each link of one layer is flexibly connected to two adjacent links of the other layer by a pair of generally C-shaped connecting brackets, each of which is interrupted by an opening at one longitudinal side and consists of an arm which extends through the link of one layer, a pair of back portions which are disposed along the longitudinal edges of the link strap and extend from the links of one layer to those of the other layer, and a pair of short arms which extend from opposite sides into the links of the other layer. When such a strap is either expanded or bent, the connecting brackets between the links of the two layers will pivot against spring action.

In a copending application of Ercole Manella, filed July 11, 1960, now Patent No. 3,063,238, granted November 13, 1962, which is assigned to the same assignee as the present application, there is disclosed and claimed a strap of the above-mentioned kind in which at least one of the arms of each connecting bracket is bent out of the position in which it extends parallel to the longitudinal sides of the bracket. This arm will then be held under an initial tension between opposite walls of the respective link casing. When the bracket is then being pivoted, the mentioned arm will be shifted by the walls of the link casing to a position different from its initial position, in which this arm, due to its own spring action, exerts a restoring moment upon the bracket. More specifically, the mentioned copending application purposes to provide one of the two short arms of the bracket which is made of spring wire with an extension which is bent out of the general plane of the bracket toward one side and is also bent in the direction toward the continuous bracket arm opposite to the two short arms.

It is an object of the present invention to provide an improvement in the arrangement described in the mentioned copending application. Instead of extending one of the short arms of the connecting bracket and bending this arm out of the general plane of the bracket and also bending it toward the continuous bracket arm, the present invention provides the continuous arm of the connecting bracket with a shallow V-shaped bend so that the apex of the wide angle thus formed in the continuous arm will be disposed outside of a straight line connecting the two ends of this arm.

There are at least two different possibilities in which the concept of the present invention may be carried out in practice. One of these possibilities consists in making the continuous arm of the connecting bracket of spring wire of a rectangular cross section and bending it like a leaf spring within the plane of the bracket to a V-shape with the apex thereof pointing inwardly in the direction toward the two short arms of the bracket. It is in this case advisable to make the entire bracket of spring wire of a rectangular cross section, in which event the short bracket arms should also be bent in the direction toward the continuous arm so that, when the strap is in the contracted position, the sleevelike link casings into which the short bracket arms extend will be held under an initial tension.

The other possibility of carrying out this invention consists in making the continuous arm of spring wire of a round cross section and in bending it laterally out of the general plane of the connecting bracket into a V-shape, and also in the direction toward the short arms, and in mounting it with an initial tension between the inner and outer walls of the link casing, the inner height of which substantially corresponds to the diameter of the wire. The sleevelike links therefore only need in this case to be made of an inner height corresponding to the diameter of the wire of which the bracket is made. The strap therefore becomes very thin. This last-mentioned embodiment also has the advantage that the connecting brackets may be very easily inserted into the links or unhooked therefrom by providing the links into which the short bracket arms extend with a pair of cutouts at their inner walls. Each individual link of this embodiment may also be bent from a single piece of flat metal since no more than the mentioned cutouts are required for shortening or lengthening the strap. However, it is necessary to limit the extensibility of the strap which may be done in a very simple manner by extending the outer walls of the link casings beyond the back portions of the brackets and by bending the projecting ends over the back portions, and by further providing the transverse side walls of the links of at least one layer within the pivoting range of the brackets with cutouts of such a depth that the edges of the remaining portions will serve as abutments to limit the pivoting angle of the connecting brackets.

In both of these embodiments, that is, in that with a V-shaped bracket arm of a rectangular cross section which is inwardly bent within the plane of the bracket, as well as in that with a V-shaped bracket arm of a round cross section which is bent outwardly of the plane of the bracket, these bent portions will be pressed out flat when the strap is being expanded because of the rotation of the continuous brackets relative to the sleevelike links. In the bracket which is made of a flat wire, the restoring force will act thereon at a point eccentrical to the central plane of the bracket since, due to the rectangular cross section of the bracket, the diagonally opposite edges thereof rest against the two opposite walls of the sleevelike links. The maximum extent of the pivoting movement of the bracket arms and thus the maximum expansion of the strap is in this case determined by the fact that, after the V-shaped bend of the continuous arm of the bracket has been pressed flat, the bracket will be presented from any further turning by the two opposite walls of the link casing. In the bracket which is made of a round wire and has a V-shaped lateral bend, this bend will likewise be straightened out flat until the strap is in the fully extended position in which the brackets are pivoted at an angle of 90°. Also in this case, the inherent resilience of the bracket will act eccentrically to the plane of the bracket and produce the restoring moment. However, the pivoting angle of the brackets must be limited in the manner as above described to less than 90° since, at a turn of 90°, the restoring moment will become zero and would even attain a negative value if the brackets were turned more than 90°.

These objects, features, and advantages of the present invention will become further apparent from the following detailed description thereof, particularly when the same is read with reference to the accompanying drawings, in which—

FIGURE 8 shows a side view, partly in section, of a second preferred embodiment of the invention, in which a part of the strap is illustrated in the contracted position;

FIGURE 9 shows a view similar to FIGURE 8, but with the strap in the expanded position;

FIGURE 10 shows a perspective view, partly in section, of the embodiment according to FIGURE 8;

FIGURE 11 shows a perspective view of a connecting bracket as applied in the embodiment according to FIGURES 8 to 10;

FIGURE 12 shows a top plan view of the bracket according to FIGURE 11;

FIGURE 13 shows a cross section taken along line XIII—XIII of FIGURE 8; while

FIGURE 14 shows a cross section taken along line XIV—XIV of FIGURE 9.

Figure 1:
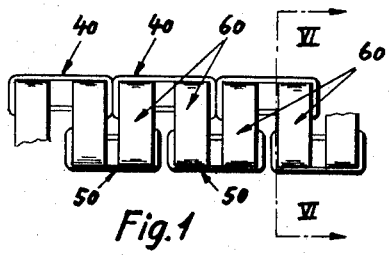
FIGURE 1 shows a side view of one preferred embodiment of the invention, in which a part of the strap is illustrated in the contracted position.
Figure 2:
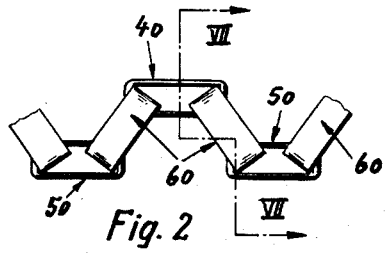
FIGURE 2 shows a side view of the same part of the strap in the expanded position.
Figure 3:
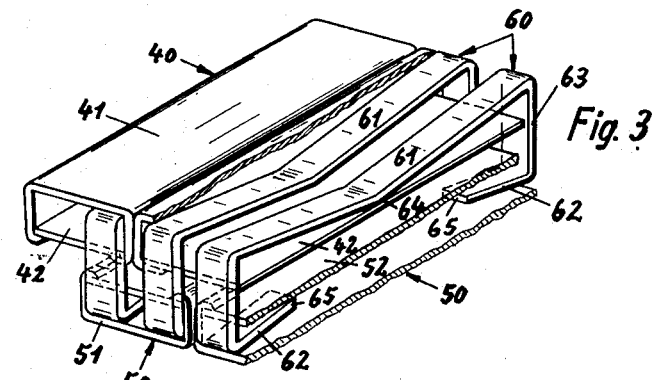
FIGURE 3 shows a perspective view, partly in section, of the embodiment according to FIGURE 1.
Figure 4:
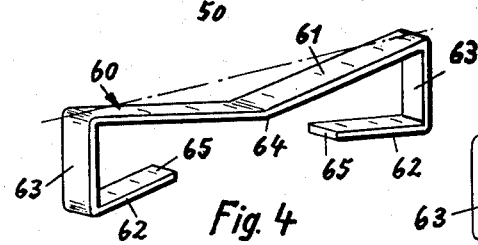
FIGURE 4 shows a perspective view of a connecting bracket as applied in the embodiment according to FIGURES 1 to 3.
Figure 5:
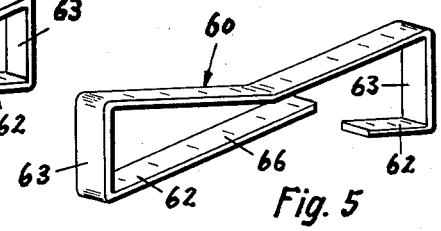
FIGURE 5 shows a perspective view of a modification of the connecting bracket.
Figure 6:
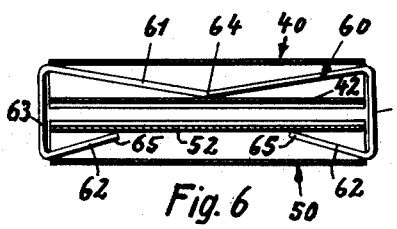
FIGURE 6 shows a cross section taken along line VI—VI of FIGURE 1.
Figure 7:
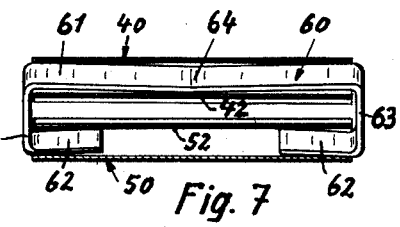
FIGURE 7 shows a cross section taken along line VII—VII of FIGURE 2.

Referring first to FIGURES 1 to 7 of the drawings which illustrate the first embodiment of the invention, the flexible link strap consists of a plurality of sleevelike link casings 40 forming an upper layer and of similar link casings 50 forming a lower layer. As illustrated particularly in FIGURE 3, each link 40 and 50 of both layers is made of two parts and consists of a sleeve 41 or 51, respectively, which is provided with a relatively wide slot on its inner side facing toward the other layer. This slot is covered by the insertion of a bottom plate 42 or 52, respectively. The connecting brackets 60 which connect the link casings 40 and 50 of both layers to each other are each made of a bent spring wire of a rectangular cross section. The continuous arm 61 of each bracket is bent inwardly within the general plane of the bracket like a leaf spring to form a wide-angular V so that the apex 64 of this arm will be disposed outside of the straight line connecting the ends of arm 61. The short arms 62 of each bracket are bent toward the continuous arm 61. The back portions 63 of each bracket lie within the edges of both layers of the links which form the longitudinal edges of the strap. Each link 40 of one layer is pivotably connected by a pair of brackets according to FIGURE 4 to two adjacent links 50 of the other layer. The inner height of each link 40 and 50 is made of such a size that the apex 64 of the V-shaped continuous arm 61 and the free ends 65 of the short arms 62 engage with an initial tension with the two bottom plates 42 or 52 of the respective links 40 and 50, as also indicated in FIGURE 6. This initial tension is adapted to maintain the link strap in the contracted position. If the strap is being expanded, as illustrated in FIGURE 2, the continuous arms 61 and the short arms 62 will rotate within the respective links of each layer, which necessarily results in the bend in the continuous arms 61 and the inwardly bent short arms 62 being straightened out. This spring force, acting only toward one side, produces a restoring moment in the brackets which tends to contract the strap.

FIGURE 5 illustrates that at least one of the short arms 62 of the connecting bracket may also be provided with an extension 66 which preferably extends beyond the center of the bracket.

According to the second embodiment of the invention as illustrated in FIGURES 8 to 14, the sleevelike link casings 70 of the upper layer and the corresponding link casings 80 of the lower layer are each made of a single piece of material and may either be made of drawn material or by bending a blank of flat metal to the desired shape. The outer walls 71 and 81 of the two links 70 and 80, respectively, extend beyond the back portions 93 of the connecting brackets 90 which are disposed within the longitudinal edges of the strap, and their overlapping ends 72 and 82 are bent over so as to cover the back portions of the brackets substantially or entirely. The transverse side walls 83 of links 80 of the lower layer are provided with cutouts 84 within the plane of the pivoting movement of connecting brackets 90, and these cutouts 84 are made of such a depth that the remaining parts 85 form abutments for limiting the pivoting movement of connecting brackets 90. For inserting the short arms 92 of the connecting brackets into the link casings 80 of the lower layer and for removing them therefrom, a pair of opposite notches 87 are provided in the inner wall 86 of these links.

The connecting brackets 90 of this embodiment of the invention are made of spring wire of a round cross section. As clearly shown particularly in FIGURE 12, the continuous arm 91 of each bracket is bent laterally out of the general plane of the bracket so that, as seen in this direction, it will have a wide-angular V-shape and the apex 94 of arm 91 will be disposed outside of the straight line connecting its ends. This laterally bent arm 91 is further bent slightly in the direction toward the short bracket arms 91, as indicated in FIGURE 11. The continuous bracket arms 91 are therefore bent both laterally as well as inwardly. Each link 70 of the upper layer which has an inner height corresponding to the wire diameter of brackets 90 contains a pair of these bent continuous arms 91. Due to the fact that arm 91 is also bent slightly toward the short bracket arms, the brackets engage with the inner walls of links 70 with a certain initial tension. The short arms 92 of the pair of brackets within each link 70 of the upper layer engage into two adjacent links 80 of the lower layer and are adapted to be inserted into or to be removed from these links through the notches 87. Since the inner height of link casings 80 of the lower layer also corresponds to the wire diameter of the connecting brackets, the brackets may be easily rotated within these casings.

When the strap is being expanded, the connecting brackets also of this embodiment are turned to an oblique angle whereby the continuous bracket arms 91 will be turned in link casings 70 of the upper layer. Since these arms 91 already engage with an initial tension in link casing 70 through their inward bend, the lateral V-shaped bend will be straightened out due to the resilience of the bracket material. The spring force which is thereby produced will act eccentrically to the common plane of the bracket and thereby exert a restoring moment upon the bracket arms so that the strap also according to this embodiment will again tend to contract due to the inherent resilience of the brackets. FIGURE 14 illustrates the connecting brackets 91 in the nearly straightened position when the strap is expanded.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an expansible link strap for ornamental and utilitarian purposes, having two layers of links forming sleevelike casings staggered relative to each other in the longitudinal direction of the strap by a distance of the width of one-half link when in the contracted position, a pair of generally C-shaped connecting brackets pivotably connecting each link of one layer with two adjacent links of the other layer, each of said brackets consisting of a continuous arm extending through a link of one layer, a pair of short arms opposite to said continuous arm extending from opposite sides into a link of the other layer, and a pair of opposite back portions connecting said continuous arm to said short arms and disposed at the longitudinal edges of the strap and extending from a link of one layer to a link of the other layer, at least one of the arms of each connecting bracket also forming a spring member by being bent to a first position at an angle relative to a longitudinal side of said respective bracket, said bent arm being retained under initial tension between opposite walls of a link of one layer and being adapted at a pivoting movement of the bracket of which such last-mentioned arm is a part to be moved resiliently by said retaining walls of said last-mentioned link into a second position different from its first position, said last-mentioned bent arm in said second position being adapted to exert a restoring moment upon such bracket, said continuous arm of each bracket being bent to have a shallow, wide-angular V-shape having an apex disposed outside of a straight line connecting the ends of said last-mentioned continuous arm.

2. In a link strap as defined in claim 1, in which said continuous arm of each bracket consists of spring wire and has a rectangular cross section, said arm being bent like a leaf spring within the general plane of said bracket to said V-shape having said apex pointing inwardly toward the two short arms of said bracket.

3. In a link strap as defined in claim 2, in which said short arms are likewise of a rectangular cross section and are bent inwardly toward said continuous arm.

4. In a link strap as defined in claim 3, in which the apex of said continuous arm and the free ends of said inwardly bent short arms of each of said brackets engage under initial tension against the inner walls of said links.

5. In a link strap as defined in claim 3, in which at least one of said inwardly bent short arms has an extension projecting beyond the center of said bracket.

6. In a link strap as defined in claim 1, in which said continuous arm consists of spring wire and has a round cross section, said arm being bent laterally out of the general plane of said bracket to said V-shape and also in the direction toward said short arms, and being mounted with initial tension between the outer and inner walls of one of said links, said link having an inner height substantially corresponding to the wire diameter of said continuous bracket arm.

7. In a link strap as defined in claim 6, in which said short bracket arms also have a round cross section, the link adapted to receive said short arms having a height substantially equal to the diameter of said short bracket arms.

8. In a link strap as defined in claim 6, in which each of said links adapted to receive said short bracket arms has a pair of opposite cutouts in its inner wall for inserting and removing said short arms.

9. In a link strap as defined in claim 8, in which said outer walls of said links project beyond said back portions of said brackets, the projecting portions of said links being bent over so as substantially to cover said back portions, the transverse walls of said links of at least one layer having cutouts within the path of the pivoting movement of said back portions, said cutouts having such a depth that the edges of the remainders of the transverse wall portions containing said cutouts will form abutments to limit the extent of the pivoting movement of said brackets.

References Cited in the file of this patent

UNITED STATES PATENTS 2,689,450    Stiegele _____ Sept. 21, 1954

FOREIGN PATENTS 560,857    Canada _____ July 22, 1958
801,850    Great Britain _____ Sept. 24, 1958
806,599    Great Britain _____ Dec. 31, 1958